Patented June 9, 1931

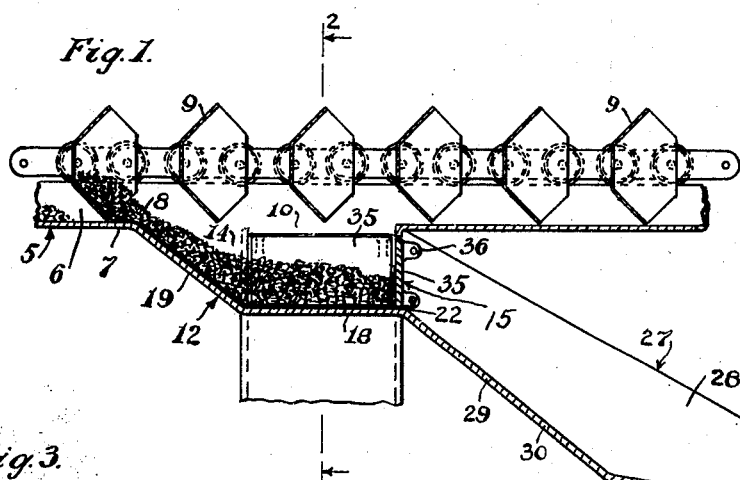
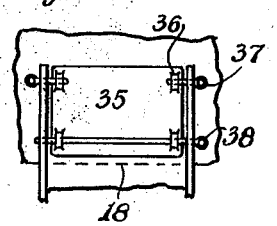
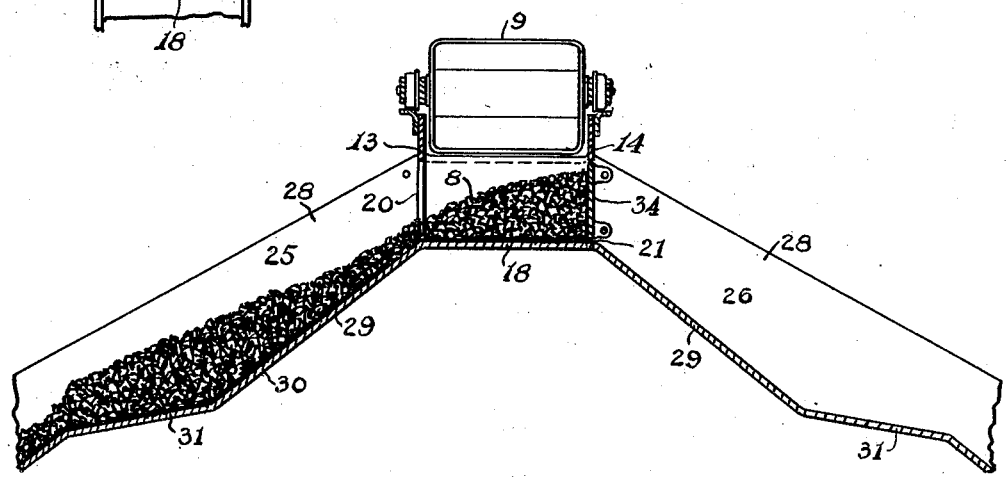

1,809,261

UNITED STATES PATENT OFFICE

HENRY ADAMS, OF PLAINFIELD, NEW JERSEY

COAL DISTRIBUTING MEANS

Application filed October 23, 1930. Serial No. 490,627.

This invention relates to apparatus or devices for distributing flowable and solid material and more particularly to means for lowering coal or the like from horizontal conveyors and distributing it to any desired one of a number of bins though it is noted that the invention is not limited to bins or conveyors nor in some respects to a number of destination points.

One object of the invention is to provide an apparatus or device of this kind for lowering coal with a minimum of breakage and degradation of size and price.

Another object of the invention is to provide an apparatus or device of this kind which is capable of distributing the material to one, two or more points of destination.

Another object of the invention is to provide an apparatus or device of this kind which will cause a pause and change of direction in the material during its travel, thereby to reduce breakage.

Other objects of the invention are to improve generally the simplicity and efficiency of such apparatus and to provide a device or apparatus of this kind which is economical, durable and reliable in operation, and economical to construct.

Still other objects of the invention will appear as the description proceeds; and while herein details of the invention are dscribed and claimed, the invention is not limited to these, since many and various changes may be made without departing from the scope of the invention as claimed in the broader claims.

The inventive features for the accomplishment of these and other objects are shown herein in connection with an improved distributing system which, briefly stated, includes a bucket conveyor having a horizontal floor having a longitudinal opening therein beneath which is disposed a compartment or hopper comprising side walls and a forward end wall extending to said floor, and a hopper floor forming a horizontal portion or platform under the forward end of said opening and an inclined portion extending from said conveyor floor at the rear of said opening to the rear of said platform, said walls being provided with door openings extending substantially to the platform. The coal flows from the conveyor down said inclined portion on to the platform. An inclined chute extends outwardly from each door opening; and closures for said door openings may be removed to permit material to flow into any desired chute.

Heretofore a distributing device has been provided for distributing coal from such horizontal conveyors, but this device caused considerable breakage of the coal; and the present invention substantially eliminates this breakage.

While in some of the claims herein are mentioned the top, front, rear and sides of the apparatus and a specific number of distributing chutes, it is understood that these are for designation and that the claims are to be construed broadly enough to cover other positions, relative dimensions, and numbers, and in general the claims should be given a broad construction, when possible for the purposes of protection.

In the accompanying drawings showing, by way of example, one of many possible embodiments of the invention, Fig. 1 is a fragmental longitudinal vertical sectional view, partly in elevation, showing the conveyor, hopper and chutes;

Fig. 2 is a transverse vertical sectional view taken substantially on the line 2—2 of Fig. 1, looking in the direction of the arrows of said line; and Fig. 3 is a fragmental front elevation of a door closure and adjacent parts.

My improved distributing means is shown in combination with a bucket conveyor 5 having a horizontal portion comprising sides 6, and a horizontal conveyor floor 7 on which the coal or other material 8 is drawn by the buckets 9, said floor having an elongated opening 10 extending from side to side thereof.

The improved system includes a hopper 12 beneath said opening comprising side walls 13, 14, a forward end wall 15, and a hopper floor having a horizontal portion on platform 18 under the forward end of said opening 10 and an inclined portion 19 preferably steeper than the angle of repose of the material thereon and extending from said conveyor floor 7 at the rear of said opening to the rear edge of said platform, whereby coal drawn along the conveyor floor slides down said inclined portion 19 to the platform.

Said side and end walls 13, 14, 15 extend upwardly from the hopper floor to said conveyor sides 6 and the conveyor floor 7 respectively; and are provided with a horizontally elongated door opening 20, 21, 22 extending substantially down to, and the distance of, the respective adjacent edges of said platform.

Any desired door opening may be left open, and thus direct the material to any desired chute or destination.

Inclined chutes 25, 26, 27 extend outwardly from the door openings respectively; and each comprises chute side walls 28 and a chute floor 29 having a portion 30 adjacent to the platform steeper than the angle of repose of coal upon the floor and a retarding or avalanche portion 31 remote from the platform less steep than the angle of repose of the material on the retarding portion.

Removable door closures 35 are provided for said door openings, the ends of said door closures being provided with ears 36, having perforations registering with perforations in the walls 28 for the reception of pins 37, 38, whereby the closures may be secured in place or any closure may be selectively removed from any one of said openings adjacent to the chute to which material is to be discharged, and the other closures left secured in the door opening. Obviously any desired or suitable securing means other than the pins 37, 38 may be used.

Material 8 is drawn onto said inclined portion 19 as in Fig. 2 until it flows out at the open door opening 20 into the desired chute, and builds up upon the avalanche portion 31 until pushed off by the material on the inclined chute-floor portion 30 above.

I claim as my invention:

1. In combination, a conveyor having a substantially horizontal floor having an opening therein; a hopper beneath said opening comprising a hopper floor having a platform and an inclined portion from said conveyor floor at the rear of said opening to the rear edge of said platform; walls for said hopper provided with door openings; chutes extending outwardly from the door openings; and removable closures for said door openings.

2. In combination, a conveyor having an opening therein; a hopper beneath said opening comprising a hopper floor having a platform and an inclined portion from said opening to the edge of said platform; walls for said hopper provided with a door opening; and a chute extending outwardly from the door opening.

3. In combination, a conveyor having an opening therein; a hopper comprising a hopper floor having an inclined portion from said conveyor opening to the lower part of the hopper; walls for said hopper provided with door openings; chutes extending from the door openings; and removable closures for said door openings.

4. In combination, a conveyor having an opening therein; a hopper beneath said opening comprising side walls and a forward end wall extending to said floor, and a hopper floor forming a platform, and an inclined portion from said opening to the platform; said side walls being provided with door openings; an inclined chute extending outwardly from each door opening; and a closure for said door openings.

5. In combination, a conveyor having a horizontal floor having a longitudinal opening therein; a hopper beneath said opening comprising side walls and a forward end wall extending to said floor, and a hopper floor forming a platform under the forward end of said opening and an inclined portion from said conveyor floor at the rear of said opening to the rear of said platform; said walls being provided with door openings extending substantially to the platform; and inclined chute extending outwardly from each door opening; and closures for said door openings.

6. In combination, a bucket conveyor having a horizontal portion comprising sides, and a horizontal conveyor floor on which material is drawn by the buckets, said floor having a longitudinal elongated opening extending from side to side thereof; a hopper beneath said opening comprising side walls, a forward end wall, and a hopper floor having a horizontal portion or platform under the forward end of said opening and inclined portion extending from said conveyor floor to said platform, whereby coal drawn along the conveyor floor slides without any fall down said inclined portion to the platform; said side and end walls extending upwardly from the hopper floor to said sides and conveyor floor respectively and each provided with a horizontally elongated door opening extending substantially to, and the distance of, the adjacent edge of said platform; chutes extending outwardly from said door openings; and closures for said door openings.

7. In combination, a conveyor having a horizontal floor having a longitudinal opening therein; a hopper beneath said opening comprising side walls and a forward end wall extending to said floor, and a hopper floor having a platform under the forward end of said opening and an inclined portion from said conveyor floor at the rear of said opening to said platform; said walls being provided with door openings substantially at the edge of the platform; an inclined chute extending outwardly from each door opening; and removable door closures for said door openings, whereby the closure may be selectively removed from any one of said openings adjacent to the chute to which material is to be discharged, and the other closures left secured in the door opening; whereby material drawn onto said inclined portion of the hopper floor builds up upon the platform until it flows out at the open door opening into the desired chute.

8. In combination, a conveyor having a horizontal floor having a longitudinal opening therein; a hopper beneath said opening comprising side walls, a forward end wall extending to said floor, and a hopper floor forming a platform under the forward end of said opening and an inclined portion from said conveyor floor to said platform; said walls being provided with door openings substantially at the edge of the platform; an inclined chute extending outwardly from each door opening and comprising chute side walls and a chute floor having a portion adjacent to the platform steeper than the angle of repose of coal upon the floor and a retarding or avalanche portion remote from the platform less steep than the angle of repose of the material on the retarding portion; and removable door closures for said door openings, the ends of said door closures and the wall adjacent thereto being respectively provided with ears having registering perforations receiving bolts or pins, whereby the closure may be selectively removed from or secured in any of the door openings.

Signed at Plainfield in the county of Union and State of New Jersey this 22nd day of October A. D. 1930.

HENRY ADAMS.